Aug. 10, 1954 G. T. BAKER 2,686,225

CIRCUIT ARRANGEMENT FOR STORING AND RETRANSMITTING IMPULSES

Filed June 16, 1950 4 Sheets-Sheet 1

George Thomas Baker

By Dezsoe Steinhez
attorney

CIRCUIT ARRANGEMENT FOR STORING AND RETRANSMITTING IMPULSES

Filed June 16, 1950 4 Sheets-Sheet 2

George Thomas Baker

By Dezso Steinher attorney

George Thomas Baker
By [illegible]
Attorney

George Thomas Baker
By Dezsoe Steinherz
attorney

Patented Aug. 10, 1954 2,686,225

UNITED STATES PATENT OFFICE 2,686,225

CIRCUIT ARRANGEMENT FOR STORING AND RETRANSMITTING IMPULSES

George Thomas Baker, Taplow, England, assignor to British Telecommunications Research Limited, Taplow, England, a British company Application June 16, 1950, Serial No. 168,453

Claims priority, application Great Britain June 23, 1949

14 Claims. (Cl. 179—18)

Figure 1:
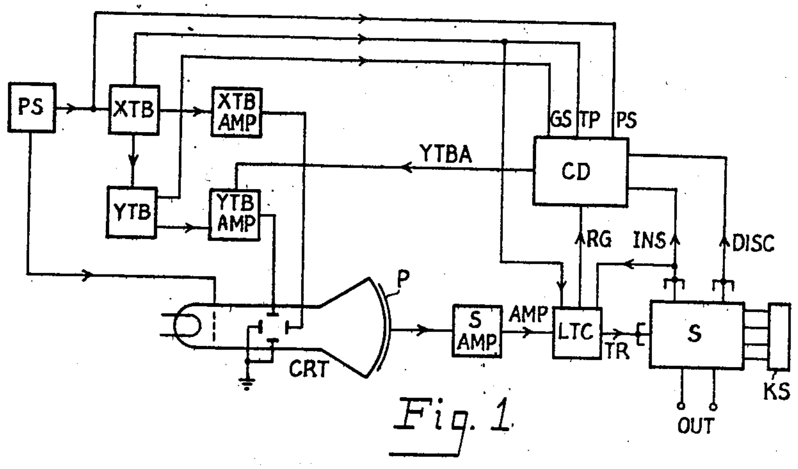

The present invention relates to circuit arrangements for storing and retransmitting impulses and while it has particular application to the storing and retransmitting of trains of impulses employed for setting up connections in telephone and like systems it will be understood that it is not limited to such application.

Arrangements are known for the electronic storing of impulses and these arrangements frequently involve the use of a cathode ray tube. The general principle of these tubes is that the beam is arranged to scan the screen, which may be of special construction and will be referred to as a storage surface, in a manner similar to a television raster. The beam intensity is controlled in time relation with the impulse pattern it is desired to store and the impinging of the beam on a particular small area of the storage surface causes a variation of charge distribution over the area, thus registering an impulse. The retransmission of the stored impulses is effected by a second scanning operation, which may serve to cancel the existing registration. Tubes of this nature are termed "memory" tubes and will henceforth be so termed in this specification.

The rate at which impulses may be stored on the storage surface and subsequently retransmitted is very high and may be many thousands per second. Such high speeds are of advantage where the memory tube is used, for instance, in conjunction with a high speed calculator but it is too high for use with, for example, telephone systems where the speed of impulse transmission is approximately 10 per second. In such a case the storing of a train of impulses on a decimal basis and also the retransmission thereof may involve a time up to 1 second and the electron beam cannot be occupied for such a period since it is essential to regenerate the impulse pattern on the storage surface several times a second to maintain the storage.

A further problem in the use of memory tubes in connection with a telephone system is purely economic. The memory tube with its associated circuits is comparatively complex and it is not a practical proposition to allocate a memory tube with its large storage capacity to the storage of the comparatively small number of impulse trains involved in the setting up of a telephone connection.

It is the main object of the present invention to provide impulse storing and retransmitting arrangements involving a memory tube in which the operation of the control circuits of the memory tube takes place at the usual high speed which is very much greater than the rate of impulse reception and retransmission required in a telephone system.

It is a further object of the invention to provide circuit arrangements whereby the memory tube is employed in an economic manner.

According to one feature of the invention, in circuit arrangements for storing signals employing a cathode ray tube of the memory type, the cathode ray tube is provided in common to a plurality of signal sources and the electron beam is controlled to traverse in turn a plurality of storage areas on the screen, each storage area being individual to one of said sources.

According to a further feature of the invention, in circuit arrangements for storing and retransmitting digits employing a cathode ray tube of the memory type conversion equipment is provided first to receive digits at one speed and to transfer them at a higher speed to the memory tube for storage purposes and second to receive stored digits from the memory tube at one speed and to retransmit them at a slower speed to enable the memory tube to be used in common to a plurality of digit sources.

According to another feature of the invention, in circuit arrangements for storing and retransmitting digits employing a cathode ray tube of the memory type the screen of the tube is divided up into a plurality of areas each of which is adapted to store a plurality of digits and control circuits are provided for causing the electron beam continuously to scan said areas successively to enable digits to be stored, stored digits to be held or stored digits to be retransmitted as required.

In one embodiment of the invention, the number of the impulses to be stored is injected into a digital counter, preferably electronic, associated with a particular impulse source. When the memory tube is next associated with the impulse source a signal indicates that a train of impulses is ready to be stored and impulses are then transmitted to drive the counter to normal and the memory tube stores such number. The memory tube thus stores the complement of the required number to a suitable predetermined number. This recording takes place extremely rapidly so that the counter is quickly cleared for the injection of the next number.

Retransmission is effected by applying a further signal to a control circuit of the memory tube and impulses are again fed to the same or a separate counter until the number counted corresponds to the number stored. The counter is then set to normal under impulse control, the resetting impulses being also transmitted to appropriate controlled equipment.

Figure 2:
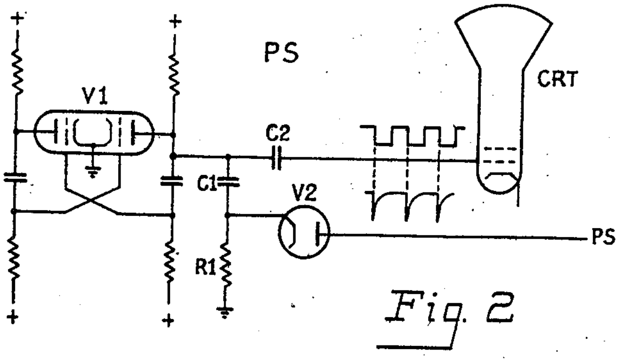
Figure 3:
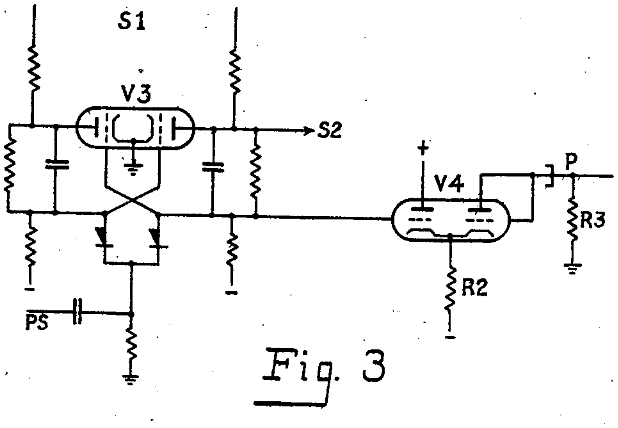
Figures 4, 5:
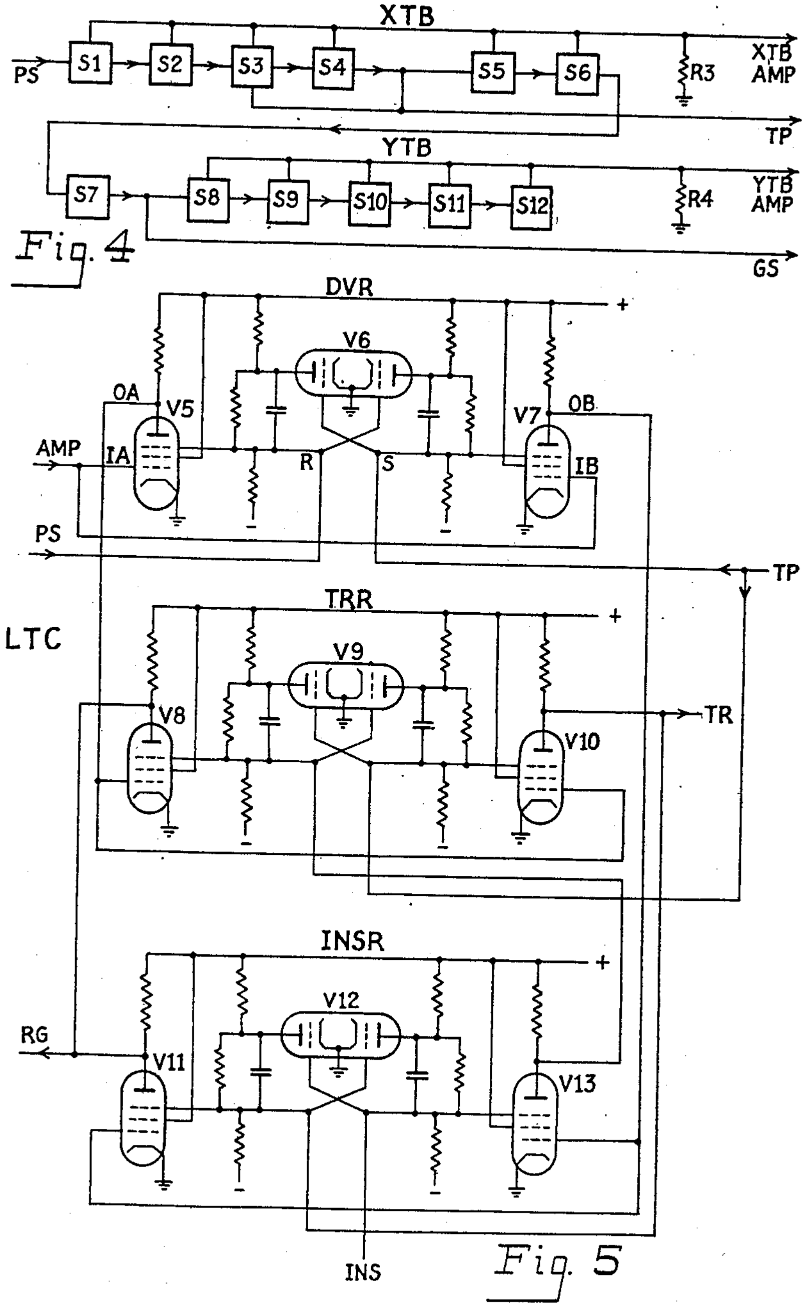
Figure 6:
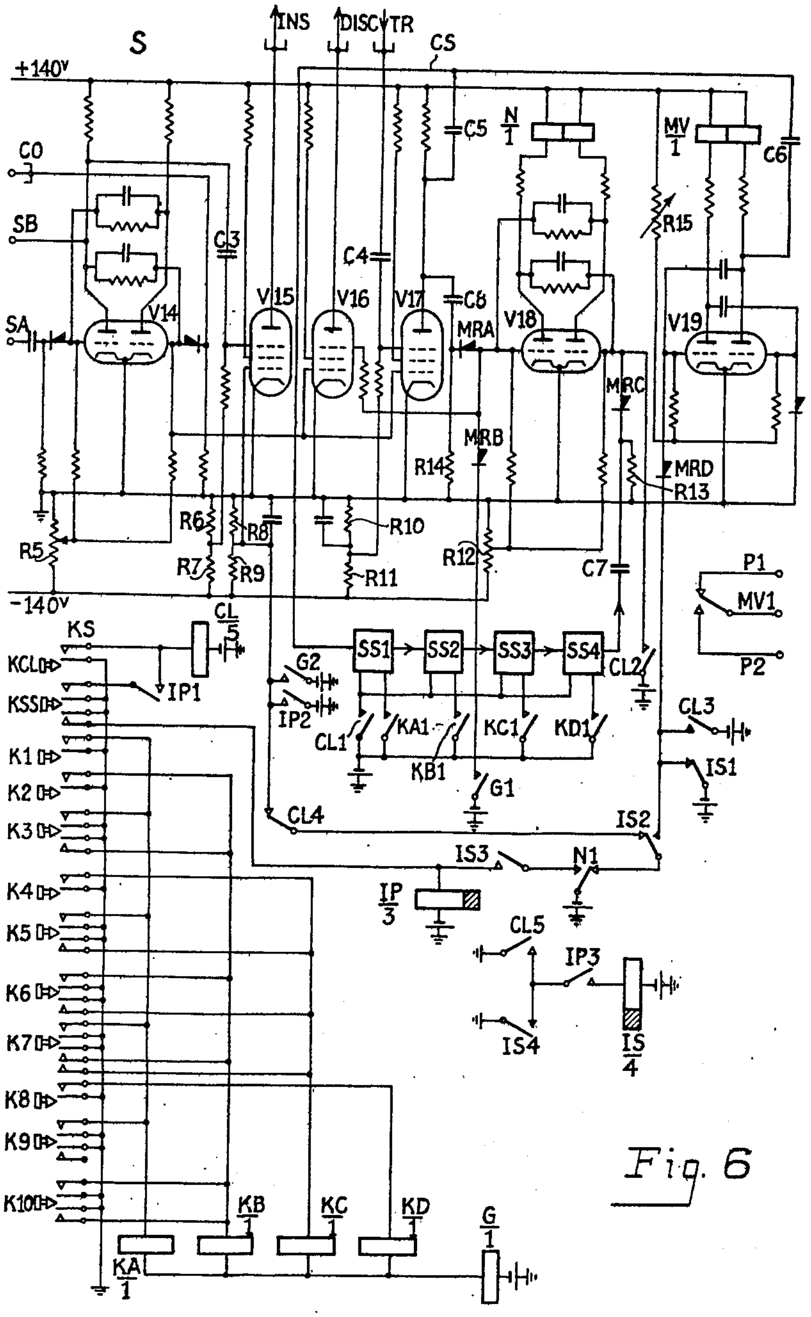
Figure 7:
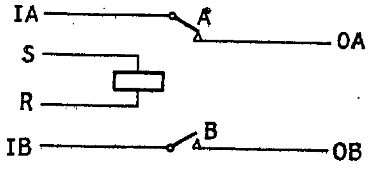
Figure 8:
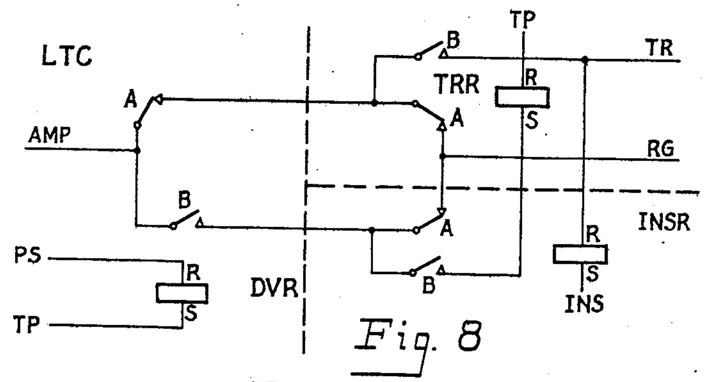
Figure 9:
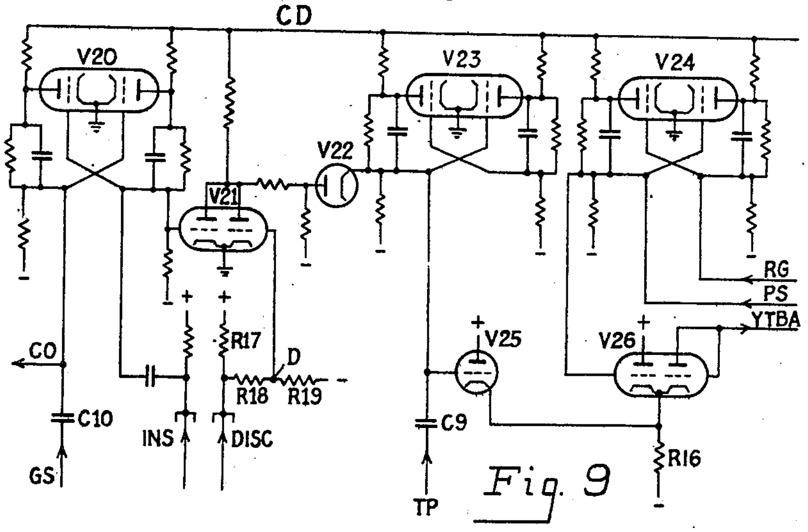
Figure 10:
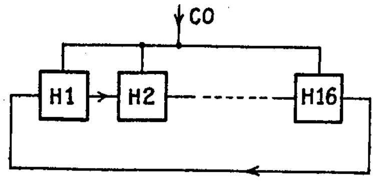

The invention will be better understood from the following description of one embodiment taken in conjunction with the accompanying drawings comprising Figs. 1 to 10. This shows it applied to equipment including a key strip, the operation of which causes corresponding trains of impulses to be transmitted over a suitable outgoing circuit. Following the usage of telephone practice, such equipment will be referred to as a sender. In the drawings Fig. 1 shows a block schematic of the component parts of the equipment, Fig. 2 shows the circuit of the pulse source, Fig. 3 shows the basic circuit for the X and Y timebase circuits, Fig. 4 shows in schematic form the way in which the X and Y timebase circuits are built up employing the circuit of Fig. 3, Fig. 5 shows the line test circuit in detail, Fig. 6 shows the keyset and the sender circuit, Fig. 7 shows diagrammatically the operation of one relay in the line test circuit, Fig. 8 shows diagrammatically the operation of the three relays forming the line test circuit, Fig. 9 shows the control and discriminate circuit and Fig. 10 shows diagrammatically one method of successively associating the senders with the common equipment.

While any form of memory tube may be employed, it is preferred to use an ordinary cathode ray tube controlled in the manner described in a paper read on November 2, 1948, by F. C. Williams and T. Kilburn entitled "A storage system for use with binary-digital computing machines" and published in the Proceedings of the Institution of Electrical Engineers, part III, No. 40, March 1949, pages 81 to 100. The method of storage described in this paper is based on the fact that when the beam of a cathode ray tube illuminates a small area of the screen, a charge distribution is set up on the screen and persists for an appreciable period of time after the beam has been cut off. Assuming the deflector plates, internal conductive coating and first and third anodes are all connected to earth while the control grid, cathode and focus electrodes are connected in normal manner with respect to a given negative potential of, say, −2000 volts, then the inner surface of the screen will also be at earth potential. Under these conditions, the charge distribution over the small illuminated area of the screen is negative. The rate of change of charge at the boundary of the small area is high so that the charge distribution curve through the area has the appearance of a "well." By applying a suitable switching potential to the control grid of the cathode ray tube and suitable shift voltages to the X and Y deflector plates of the tube, a series of "wells" or dots may be set up on the screen or storage surface of the tube in the form of a two-dimensional array.

A signal or "pick-up" plate, consisting of a sheet of metal foil or gauze, external to the screen is closely attached to the face of the tube and each time a well is formed, a pulse is transmitted through the pick-up plate and thence to an amplifier which is usually arranged to deliver a positive-going output.

In order to maintain the dot pattern on the storage surface, the beam is controlled so as to scan the two-dimensional array continuously. Providing the time of one scan is small compared with the leakage time-constant of the screen, and this is readily possible, very little change occurs in the charge distribution from one scan to the next so that no impulse is passed through the pick-up plate during regeneration.

Further, if the distance between the centres of two adjacent dots is less than a critical distance, approximately 1.33 times the diameter of a dot, it is found that the beam when excavating the second dot, partially refills the first and this effect is employed for erasing purposes as will be described in detail later.

In adapting this method for the storage and retransmission of pulses in a telephone system, it is preferred to use 12 dots for each digit to be stored. It is possible to include 48 dots in each line of the two dimensional array thus providing 4 digits for each line and to obtain 32 lines. Further it is sufficient to provide for the storing of 8 digits for each control circuit or sender so that 2 lines are allocated to each sender and one cathode ray tube may thus be provided in common to 16 senders.

As mentioned above the beam continuously scans the two dimensional array and the senders are associated with the tube automatically for the portion of the scan during which the beam is passing over the lines allocated to them, that is to say the senders are associated with the tube on a time division basis irrespective of whether a particular sender actually requires connection to the tube for storing or retransmission.

The method of storing the digits in the present arrangement is slightly different to any of the methods described in the paper. Each line is subdivided into two as shown below, the upper subdivision being designated position 1 while the lower is designated position 2. In the unwritten or normal line, all the dots are in position 2:

```
Position 1
Position 2  x x x x x x x x x x x x
```

and the separation of the dots is greater than the critical separation mentioned above. In a written line, the dots appear partly in position 1 and partly in position 2:

```
Position 1  x x x x x
Position 2            x x x x x x x
```

The separation between a dot in position 1 and a corresponding dot in position 2 is less than the critical separation.

In operation, assuming the line is unwritten, the beam is controlled to impinge at the beginning of a line in position 1. The beam will excavate a well or form a dot and a pulse will be obtained from the amplifier. This pulse causes a shift voltage to be applied to the Y deflector plates to bring the beam immediately to position 2. This switching action takes place very rapidly and the shift occurs before the beam is cut off. A dot is already in existence in position 2 however, and hence no impulse is obtained from the amplifier. The shift is however maintained until the beam is cut off when it is removed and the beam returns to position 1. Further since the dots in the two positions are within the critical distance, the presence of the dot in position 2 causes the dot formed in position 1 to be filled and hence erased. Since there is no dot in the next area in position 1, the same operation occurs and the beam is switched to position 2. The dot caused by the beam in position 1 is filled or erased. Thus where a line is unwritten, the total effect is to cause the regeneration of the dots in position 2.

Now assume that a digit is to be stored on the screen i. e. written on the screen. In this case when the beam arrives on the first area in position 1 the shift circuit does not become effective and the required number of dots plus one are formed in position 1 and the corresponding dots in position 2 erased. The reason for the additional dot will be explained subsequently. As long as this digit is stored on the screen, no pulses will be obtained from the amplifier when the beam scans he dots in position 1 and again the shift is not applied so that the dots in position 1 are regenerated. When the beam passes beyond the last dot in position 1, however the shift becomes effective and the dots in position 2 are regenerated.

When it is required to read the digit, the beam is caused to move to position 2 the first area of which will be empty. A dot is formed at the first area in position 2, a pulse is delivered by the amplifier and the corresponding dot in position 1 is erased. This operation continues with subsequent dots and finally the existing dots in position 2 are regenerated so that when the beam reaches the end of the line, dots occur in position 2 only. The required digit has thus been transmitted and erased from the storage surface.

The circuits for controlling the beam and for using the pulses delivered by the amplifier will now be described and reference will first be made to Fig. 1. The common equipment consists of a cathode ray tube CRT, a signal amplifier S AMP, a line test circuit LTC, a control and discriminate circuit CD, a pulse source PS, X and Y timebase circuits XTB and YTB respectively and their associated amplifiers XTB AMP and YTB AMP respectively while the individual equipment consists of sixteen sender circuits and associated keyset, two only of the senders SE1 and SE2 and keysets KS1 and KS2, being shown for convenience. It should be mentioned that although the sender is shown controlled by a keyset this is by way of example only and the sender may be controlled by any other suitable means such as, for example, a perforated tape.

The pulse source PS has two outputs, one of which is a square waveform having a recurrence frequency of 50 kc./s. and serves to switch the beam of the tube on and off while the other is a narrow pulse obtained by differentation of the square waveform and coincident with the negative-going edge thereof. This narrow pulse serves to control the X and Y timebase circuits and is also fed to the control and discriminating circuit for switching purposes as will be described later. The X timebase circuit provides a stepped waveform, the duration of each horizontal portion of the step being of the order of 20 micro-secs. while the duration of on-switching of the beam is 10 micro-secs. The X timebase circuit provides an output on every 12th pulse which is applied over lead TP to the control and discriminate circuit CD for switching purposes and to the line test circuit LTC. The Y time-base circuit provides a group pulse for every two lines and this pulse is fed over lead GS to the control and discriminate circuit CD. The pulses derived from the pick-up plate P are fed to a signal amplifier S AMP of conventional type and the output from the amplifier is fed to the line test circuit LTC and thence to the sender circuit S. The line test circuit is a switching circuit which serves to control, in conjunction with the control and discriminate circuit CD, the application of the previously mentioned shift voltage over lead YTBA to the Y plates of the tube. The line test circuit itself responds to signals transmitted to it from the sender S over the instruction lead INS. A signal is transmitted over this lead at a time when a sender which requires to carry out a writing or reading operation is associated with the common equipment. These signals are also transmitted to the control and discriminate circuit CD while the determination as to whether a writing or reading operation is required is effected over the lead DISC extending from the sender to the control and discriminate circuit. Stored impulses are retransmitted over terminals OUT of the sender circuit. These various circuits will now be considered in detail.

The circuit of Fig. 2 shows the pulse source PS which consists of a multivibrator comprising the double triode V1 and its associated resistors and capacitors. The square waveform obtained from the right-hand anode is applied to the control grid of the cathode ray tube via the capacitor C2 and also to the differentiating circuit comprising capacitor C1 and resistor R1. The output from the differentiating circuit passes over the lead PS to the X timebase circuit XTB (Fig. 3) and to the control and discriminate circuit CD (Fig. 9). The inclusion of the diode V2 in the lead PS ensures that only negative-going pulses are fed over PS. It will be seen from the waveforms given in Fig. 2 that the negative-going pulses occur at the end of the positive-going waveform applied to the control grid of the cathode ray tube i. e. at the moment when the beam is cut off.

The X and Y timebase circuits are of the digital step-by-step type and the basic switching circuit is shown in Fig. 3. This consists of a scale-of-two stage comprising the valve V3 and its associated resistors and capacitors and a switching stage consisting of a double triode V4. The scale-of-two stages comprises a relaxation circuit having two conditions of stable equilibrium and, assuming the circuit shown is that of stage S1, is driven from the pulse source over lead PS. The left-hand portion of the double triode V4 is arranged as a cathode follower and when the right-hand portion of V3 is non-conducting, the current flow through the cathode resistor R2 increases so that the cathode potential is sufficiently positive to cut off the right-hand portion of V4 which is connected as a diode. When the condition of V3 is reversed, however, part of the current flow through R2 passes through the diode and thence through R3, which is common to all stages. Thus a small potential is developed at the common point, the potential being negative with respect to earth or other selected reference potential. The resistor R2 will have different values in the different stages according to the amount of shift corresponding to each stage. The value of resistor R2 is always very large compared with that of R3 so that the resistance variation from stage to stage is substantially linear.

The switching stages are built up to provide the timebase circuits as shown in Fig. 4. As regards the X timebase circuit four switching stages S1, S2, S3 and S4 are arranged in series to form a 12-point counter, the feedback from S4 to S3 serving to reduce the count from 16 to 12. An output is taken from stage S4 so that each 12th pulse is applied over lead TP to the control and discriminate circuit CD (Fig. 9) and to the line test circuit LTC (Fig. 5). As previously pointed out 12 dots are required for the storage of one digit and as there are four digits to a line, two more scale-of-two circuits S5 and S6 are provided. The output from the last stage S6 is fed to the Y timebase circuit which consists of 5 scale-of-two stages S7, S8, S9, S10 and S11 to give a 32-point counter there being 32 lines in the array. Since there are two lines allocated to each sender, the output from the stage S7 is taken over lead GS to the control and discriminate circuit CD (Fig. 9) and serves to indicate the moment of disconnection of one sender and the connection of the next. It will be understood that resistor R3 is the same as resistor R3 shown in Fig. 3 while resistor R4 is a similar common resistor for the Y timebase circuit. The voltages developed across resistors R3 and R4 are fed respectively to the X and Y timebase amplifiers XTB AMP and YTB AMP (Fig. 1). The circuits of these amplifiers are conventional and are not shown in detail, the outputs being applied to the X and Y deflection plates as shown in Fig. 1.

A description will now be given of the sender circuit S and keyset KS shown in Fig. 6. The sender includes two relaxation circuits having two conditions of equilibrium and comprising the two double triodes V14 and V18 with their associated resistors and capacitors. In view of the particular use of these circuits as switches they will henceforth be referred to as toggle circuits, V14 being termed the H toggle and V18 the N toggle. Pentodes V15 and V16 control the transmission of signals over the instruction and discriminate leads INS and DISC respectively while pentode V17 is concerned with the passage of pulses from the signal amplifier S AMP (Fig. 1) to the electronic counter in the sender. The valve V19 is arranged to operate as a multivibrator to control the operation of relay MV which at contacts MV1 transmits impulses over the outgoing leads P1 and P2 at the rate of 10 per second.

The H toggle, V14, serves to associate the sender with the common equipment. The H toggles of all the senders are connected in a ring and are so arranged that one is in the opposite condition to all the others, thereby associating its sender with the common equipment. The operated H toggle is returned to normal, for instance by the pulse transmitted over the lead GS from the Y timebase circuit and in reverting to normal passes on a pulse to the next H toggle in the ring to change this over. The circuits for this operation have not been shown in detail but the arrangement is indicated generally in Fig. 10. In Fig. 10, H1, H2, . . . H16 correspond to the H toggles of the 16 senders associated with the common equipment.

The electronic counter in the sender comprises four scale-of-two stages SS1, SS2, SS3 and SS4 arranged to form an 11-point counter. This counter is generally similar to the counter comprising the stages S1–S4 except that the feedback connections, which are not indicated in Fig. 6 make it an 11-point instead of a 12-point counter. It is operated somewhat differently according as to whether a writing or a reading operation is in progress. Consider first the writing operation. The depression of a particular key of the keyset causes the operation of one or more of contacts KA1, KB1, KC1 and KD1, the effect of which is to change over the stage associated therewith and thus to inject into the counter the digit which corresponds to the key depressed. When the sender is connected to the common equipment an impulse is transmitted to the sender over lead TR for each dot except the first stored on the screen and these impulses operate the counter. This continues until the counter is counted out when a signal is transmitted to the common equipment to indicate that the required number of dots have been stored in position 1. The remainder of the line is filled with dots in position 2. It will be appreciated, of course, that the number of dots stored corresponds to the complement to the number 11 of the digit required.

During transmission of a digit, an impulse is received over the lead TR for each dot except the first formed on the screen in position 2 and these pulses are again counted by the electronic counter. The number of pulses so counted will be the complement of the digit required to the number 11 and at the end of the reception of the stored pulses, the multivibrator MV is effective in transmitting pulses to line over contacts MV1 and also via C to SS1. These pulses are also fed to the counter and transmission continues until the counter is again counted out so that the digit transmitted to line corresponds to the key which was previously depressed.

The keyset KS consists of ten keys K1 to K10 corresponding to the digits 1 to 10, a start send key KSS and a clear key KCL. The keys K1 to K10 are wired to four relays KA, KB, KC and KD so that the operation of one of the keys serves to cause the operation of one or more of the relays to inject the required digit into the counter as described above. The following table shows the relation between key operation, relay operation and stages changed over:

| Key | Relay | Stage |
|---|---|---|
| K1 | KA | SS1 |
| K2 | KB | SS2 |
| K3 | KA, KB | SS1, SS2 |
| K4 | KC | SS3 |
| K5 | KA, KC | SS1, SS3 |
| K6 | KB, KC | SS2, SS3 |
| K7 | KA, KB, KC | SS1, SS2, SS3 |
| K8 | KD | SS4 |
| K9 | KA, KD | SS1, SS4 |
| K10 | KB, KD | SS2, SS4 |

It will be noted that relays KA, KB, KC and KD are each connected in series with a slow-to-release relay G.

In the normal condition of the circuit, i. e. while the sender is disconnected from the common equipment, the right-hand portion of V14 is non-conducting i. e. the control grid is negative with respect to earth so that the inner control grids of V16 and V17 are negative and both these valves are cut-off. The inner control grid of V15 is connected to the potentiometer comprising resistors R8 and R9 connected between 0 and −140 volts. Resistor R9 is considerably greater than R8 so that this control grid is substantially at earth potential. The outer control grid of V15 is normally at negative potential being connected to a point on the potentiometer R6, R7 also connected between earth and −140 volts so that the valve is normally non-conducting. A momentary positive-going pulse is however applied to the outer control grid when the H toggle trips in view of the connection from the left-hand anode of V14 via condenser C3 to the outer control grid. Hence provided the inner control grid is at earth potential at this time, a pulse will be extended over lead INS to the control and discriminate circuit CD. However the inner control grid may be negative at this time depending on the condition of relay N, G or IP as will be described later.

In the normal condition of the N toggle V18 the left-hand portion is conducting and the right-hand portion non-conducting and contacts N1 are in the position shown in the drawing. The N toggle is tripped by the operation of contacts G1 on writing or by the first pulse received over lead TR on reading in a manner to be described later and in both cases is returned to normal when the counter is counted out by a pulse via condenser C7.

The circuit operates in the following manner. Assume first that there is no digit to be stored and no digit to be retransmitted. When the H toggle is tripped, a positive pulse is applied via C3 to the outer control grid of V15 but this is without effect since the valve is cut off on the inner control grid from the negative of N1 over IS2 and CL4. The N toggle is not tripped nor do either of the valves V16 and V17 conduct. Finally the multivibrator is maintained inoperative by a negative potential applied via IS1 and metal rectifier MRD. No signals are therefore transmitted over leads INS or DISC and, since the beam will be regenerating dots in position 2 only, no pulses will be received over the lead TR.

Now assume that the operator is setting up a number on the keyset KS and that the first digit is the digit 5. Key K5 will be depressed thereby extending earth to relays KA and KC which operate together with relay G. Relays KA and KC at contacts KA1 and KC1 change over stages SS1 and SS3 in the counter thereby injecting the digit 5. In addition relay G at contacts G1 extends a negative potential through rectifier MRB to the N toggle which is thus tripped. Contacts N1 are thus operated to the alternative position but the negative potential on the inner control grid of V15 is maintained at G2 until the operator has released the key K5. Relay G then releases.

The transposition of the N toggle, as well as causing the changeover of contacts N1, also causes a negative potential derived from potentiometer R12 to be extended to the outer control grid of the valve V16 for a purpose to be described later.

The condition of the circuit is thus as follows:

1. The digit 5 has been injected into the electronic counter.
2. The N toggle has been transposed i. e. the left-hand portion of V18 is non-conducting.
3. The multivibrator V19 remains locked.
4. The inner control grid of V15 is at earth potential but the valve is cut off on the outer control grid.
5. The inner and outer control grids of V16 are both negative with respect to earth.
6. The inner control grid of V17 is negative with respect to earth.

When the H toggle of the sender immediately preceding the sender S reverts to normal, a negative-going pulse is applied to terminal SA of the H toggle shown and the H toggle is transposed. As a result of this transposition a positive-going pulse is applied from the anode of the left-hand portion of V14 via C3 to the outer control grid of V15. Now the inner control grid of V15 is at earth potential and hence a negative-going pulse is obtained in the anode circuit which extends into the control and discriminate circuit CD (Fig. 9) over the instruction lead INS. This pulse gives an indication that the sender S either has a digit to be stored (writing) on the common equipment or is ready for the transmission of a digit from the common equipment (reading). The determination as to whether writing or reading is required is effected over the discriminate lead DISC, the arrangement being such that current flows over the lead for reading but not for writing. This is determined by the instant at which the N toggle is transposed. As previously described, for writing the N toggle is transposed on the operation of relay G and remains transposed until the digit has been stored in the common equipment. During the whole of this period the outer control grid of V16 is negative with respect to earth and hence the valve V16 does not conduct and no current flows over the lead DISC. For reading, the toggle N is not tripped until the first impulse is received over lead TR and hence when the H toggle trips, V16 conducts and current flows over lead DISC until the N toggle is tripped.

The transportation of the H toggle also causes a positive potential to be applied to the inner control grids of V16 and V17 from the now positive control grid of the right-hand portion of V14. As regards V16 this positive potential is ineffective since as just pointed out for writing V16 is cut off on the outer control grid. The action of V17 will be described subsequently.

When the instruction pulse is transmitted over lead INS to the control and discriminate circuit, this circuit prevents the shifting of the beam from position 1 to position 2 and since there is no dot in position 1 a positive pulse is obtained from the amplifier S AMP and performs a switching operation in the control and discriminate circuit CD to enable subsequent pulses from the amplifier to be transmitted over the transfer lead TR and condenser C to the outer control grid of V17. As mentioned above the inner control grid of V17 is positive with respect to earth so that the pulses applied to the outer control grid pass through the anode circuit. These pulses which will be negative-going are applied to the N toggle but are without effect since the left-hand portion of V18 is non-conducting. The pulses are also applied via capacitor C5 and lead CS to the input to the electronic counter which thus registers a count of 6 after the receipt of the first pulse. As the beam of the cathode ray tube moves from area to area in position 1, the pulses received over TR operating the counter step-by-step and on the reception of the 6th pulse the counter registers a count of 11. A pulse is then transmitted from the 4th stage SS4 via capacitor C7 and rectifier MRC to the control grid of the right-hand portion of V18. The N toggle thus reverts to normal whereupon the control grid of the left-hand portion becomes positive with respect to earth and this positive potential is applied to the outer control grid of V16, the inner control grid being at earth potential. The valve thus conducts and current flows over the discriminate lead DISC to the control and discriminate circuit CD where it causes the beam to shift from position 1 to position 2 and since dots already exist in position 2, regeneration only takes place and no further impulses are received over the transfer lead TR.

The reversion to normal of the N toggle also causes contacts N1 to revert to the position shown in the drawing, thereby replacing the negative potential on the inner control grid of V15. When the beam has scanned the two lines allocated to the sender S, the group pulse is fed over lead GS to reset the H toggle, whereupon a negative-going pulse is obtained from the anode of the left-hand portion of V14 and this negative-going pulse is applied over lead SB to set the H toggle of the next sender. In addition the reversion of the toggle reapplies a negative potential to the inner control grids of V16 and V17 and the sender circuit is restored to its normal condition.

It will be understood that the above operations occur extremely rapidly and will in all cases be completed before the operator depresses the next key, as the circuits are arranged for the beam to scan the screen 30 times a second.

The sender now awaits the operation of the next digit key by the operator and this is transmitted to the common equipment as described above.

Consideration will now be given to the operation of the sender when a stored digit is to be transmitted from the common equipment. In the first place it should be pointed out that the digit stored in the common equipment is the complement of the required digit to the number 11. In the case considered above, 5 was the required digit and the digit stored was 6. Retransmission of this digit will now be considered.

When the operator has depressed the required digit keys, she operates the start-send key KSS to indicate that sending may begin. The operation of the start-send key causes the operation of relay IP, of relay CL over IP1 and of relay IS over CL5 and IP3. Relay IP at IP2 applies an additional negative potential to the inner control grid of V15 while relay IS in operating locks over IS4. When the operator releases the start-send key KSS, the circuit of relay IP is opened and this relay releases followed by relay CL. The circuit of relay IS is also opened but its slow-to-release characteristics enable it to be maintained operated until relay IP is re-operated as will be described later. The release of relay IP and the continued operation of relay IS results in the disconnection of negative potential from the inner control grid of V15 due to the opening of contacts IP2 and the changeover of contact IS2. Finally the multivibrator MV remains locked over IS2 and N1, IS1 being now open.

When the H toggle is tripped, a positive pulse is applied to the outer control grid of V15 as before and a pulse is again transmitted over the instruction lead INS to the control and discriminate circuit CD. The H toggle in transposing also applies a positive potential to the inner control grids of V16 and V17 and this time as the outer control grid of V17 is positive, current flows over the discriminate lead DISC to the control and discriminate circuit CD. This causes the beam to shift from position 1 to position 2. Now there will be no dots in the earlier areas of position 2 since a digit is stored. Hence as the beam moves along the line pulses will be transmitted from the amplifier to the control and discriminate circuit which absorbs the first pulse and transmits the subsequent pulses over lead TR to the outer control grid of V17. The inner control grid is positive with respect to earth and hence the pulses appear in the anode circuit as negative-going pulses and are fed as before to the electronic counter. Now the digit 6 was stored on the screen and consequently 6 impulses will be transmitted over the lead TR. On the next step of the beam in position 2, a dot will be encountered and no impulse will be received and the same will apply to subsequent steps. The digit 6 is thus stored on the electronic counter.

The first pulse in the anode circuit of V17 is also applied via C8, R14 and MRA to the control grid of the left-hand portion of V18, thus tripping the N toggle. At contacts N1 the circuit of relay IP is again completed over IS3, relay IS not having had time to release. Contacts IP2 again place a negative potential on the inner control grid of V15 to prevent the transmission of a further instruction pulse until the multivibrator has completed its operation. The lock is removed from the multivibrator on the operation of contacts N1. However the multivibrator is arranged to have a recurrence frequency of 10 per second and since the pulses from the common equipment are received extremely rapidly, they will all have been stored in the counter before the multivibrator has transmitted one impulse. The relay MV in the anode circuits of V19 is arranged in a similar manner to relay N and in the locked condition of the multivibrator i. e. with the right-hand portion conducting, the contacts MV1 are in the position shown. When the lock is removed on the operation of relay N, the right-hand portion will eventually become non-conducting and the contacts MV1 will change over to initiate the first pulse. This pulse is terminated when the right-hand portion again becomes conducting and a negative-going pulse is then transmitted from the anode circuit of the right-hand portion via C6 and the lead CS to the electronic counter. The multivibrator continues to operate until it has transmitted 5 impulses at the rate of 10 impulses per second when 11 pulses will have been fed to the counter. On the 11th pulse, a pulse is fed from the fourth stage SS4 to the N toggle which is then returned to normal and again locks the multivibrator over contacts N1 and IS2. Five impulses have thus been transmitted over leads P1 and P2 corresponding to the operation of the digit key K5.

In addition the restoration to normal of contacts N1 opens the circuit of relay IP. Relay IP is a slow-to-release relay, however, and remains operated, thus preventing the transmission of a further instruction pulse, for such a period as to give a suitable interdigital pause. Relay IP in releasing again opens the circuit of relay IS but this relay is also a slow-to-release relay, its release period being such that if there is a further digit to be transmitted, a complete scan, the tripping of the H toggle, the transmission of the instruction pulse and the tripping of the N toggle takes place before relay IS has released. Relay IP is thus reoperated over N1 and IS3 and transmission of the digit takes place as previously described. If there is no further digit to be transmitted, relay IS releases and no further transmission can take place until the start-send key is again operated.

The clear key KCL is provided to enable the operator to cancel an existing digit set-up if she has made a mistake or for any other purpose. The operation of the key KCL causes the operation of relay CL which at CL4 opens the circuit for applying negative potential to the inner control grid of V15. This enables an instruction pulse to be transmitted each time the sender is associated with the common equipment. Further at contacts CL2 the N toggle is maintained in its normal position while contacts CL3 prevent further operation of the multivibrator MV in the case where the clear key is operated during transmission. In the latter case, the opening of contacts CL4 may not be immediately effective since it will be necessary to wait for the release of relay IP. Since the N toggle is maintained in its normal condition, reading will take place but the pulses incoming to the sender over TR will not be transmitted and although they will be transmitted over the lead CS they will have no effect on the counter owing to the operation of contact CL1. The clearing operation will of course take place very rapidly and will be easily completed during the time during which the key KCL is depressed.

A description will now be given of the operation of the control and discriminate circuit shown in Fig. 9. This circuit includes three toggles comprising the three double triodes V20, V23 and V24 and the associated capacitors and resistors, and three switching valves V21, V25 and V26. In the normal condition the left-hand portion of V20, both portions of V21, and the left-hand portions of V23 and V24 are all conducting. The diode V22 is non-conducting, V25 is cut off on the control grid and so is the left-hand portion of V26. The left-hand portion of V26 is connected as a cathode follower while the right-hand portion is connected as a diode and is normally conducting. The output from the right-hand portion is taken to the Y timebase amplifier YTBA where it is combined with the output from the Y timebase circuit. When the right-hand portion of V26 is conducting, the effect as regards the beam is to cause it to scan over position 1. When the right-hand portion is cut off in the manner described later, an additional shift voltage is applied to the Y timebase waveform to cause the beam to scan over position 2. The right-hand portion of V26 is switched on and off under the control either of the left-hand portion of V26 which is itself controlled by the toggle V24 or by V25 which is itself controlled from the toggle V20 through V21, V22 and the toggle V23.

In order to understand the operation of this circuit, it will be assumed that a sender such as S wishes neither to write nor to read. When the sender is associated with the common equipment by the operation of its H toggle, no pulse is received over the instruction lead INS and no current flows over the discriminating lead DISC so that valves V20, V21, V22, V23 and V25 remain in their normal condition. Further the right-hand portion of V26 is conducting so that the beam begins to scan the line in position 1. A pulse will, however, be received from the amplifier and this is fed through the line test circuit LTC (Fig. 5) to the regenerate lead RG to transpose the toggle V24. The control grid of the right-hand portion of V24 now becomes positive and this positive potential is applied to the control grid of the left-hand portion of V26. This left-hand portion therefore conducts. It will be noted that both portions of V26 have a common cathode resistor R16 and when current flows through the left-hand portion, the cathode goes positive to an extent sufficient to cut off the diode portion, thus resulting in the application of a shift voltage to the deflector plates, and the regeneration of the dot in position 2. The lead PS from the pulse source is connected to the control grid of the right-hand portion of V24 and V24 consequently reverts to normal after each dot. The left-hand portion of V26 is then cut off, the diode portion again conducts and the shift is removed. This continues over the whole of the two lines allocated to the sender.

A somewhat similar operation occurs when the sender wishes neither to read nor to write but a digit or digits is or are stored on one or more of the lines allocated to the sender. In this case no instruction pulse or discriminate signal will be received and when the beam reaches the first area in position 1, it will find a dot and no pulse will be received from the amplifier. No control will be received by the line test circuit over the lead RG and hence no shift will be applied until dots appear in position 2 when the operation will be the same as that described above.

It will now be assumed that the sender S is in a position either to write or to read. When this sender is associated with the common equipment, a negative-going pulse is received over the instruction lead INS as previously described and V20 is transposed. The control grid of the left-hand portion of V20 thus becomes negative with respect to earth and this negative potential is applied to the control grid of the left-hand portion of V21. The left-hand portion is thus cut off and the anode voltage thus depends on the potential at the point D. As previously described if the sender wishes to write, there will be no current flow over lead DISC and the potential divider R17, R18, R19 is such that a positive potential will be maintained on the control grid of the right-hand portion of V21. This portion therefore conducts and the anode voltage is sufficiently low to prevent conduction of the diode V22 so that no transposition of V23 takes place, and V25 remains cut off. During writing the instruction control is effective on the line test circuit LTC (Fig. 5) to apply pulses from the amplifier to the transfer lead TR instead of to the regenerate lead RG. The toggle V24 is thus unaffected and hence the diode portion of V26 remains conducting and the beam writes in position 1. When the required number of dots have been written, current flows over the discriminate lead DISC and the right-hand portion of V21 is cut off. The anode voltage of V21 thus rises, the diode V22 conducts and the toggle V23 trips. The control grid of V25 thus goes positive and the valve conducts. It will be seen that V25 is connected as a cathode follower, the cathode resistor R16 being that for V26. The conduction of V25 thus has the same effect as the conduction of the left-hand portion of V26 and consequently the diode portion is cut off, the shift is applied until V23 reverts to normal and the dots in position 2 are regenerated, no further pulses being obtained from the amplifier. When the beam reaches the end of the section of the line allocated to the digit in question, the 12th pulse from the X timebase circuit XTB is applied over condenser C9 to the control grid of the right-hand portion of V23 which thus reverts to normal and V25 is cut off. The 12th pulse from the X timebase circuit XTB is also applied to the line test circuit LTC to bring about a circuit change which enables any pulses from the amplifier relative to subsequent digits to be transmitted over the regenerate lead RG and not the transfer lead TR. In the remainder of the two lines, therefore, the dots are regenerated only, whether they are in position 1 or position 2.

Now assume that the sender wishes to read. In this case a pulse is received over the instruction lead INS when the H toggle trips to associate the sender with the common equipment. In addition, as previously described, current flows over the discriminate lead DISC so that V20 is transposed and both parts of V21 are cut off. Current then flows through the diode V22 and the toggle V23 is consequently transposed, V25 conducts and the shift is applied. As before the instruction pulse is effective in the line test circuit LTC so that the pulses from the amplifier are transmitted over the transfer lead TR instead of over the regenerate lead RG. The beam thus scans in position 2, inserting dots in this position and erasing the existing dots in position 1. When dots appear in position 2, no further pulses will be obtained from the amplifier, but the shift continues to be applied until V23 reverts to normal on the 12th pulse. Further current flow over the discriminate lead DISC ceases on the transposition of the N toggle in the sender on the reception of the first pulse over lead TR. Hence V23 cannot be again transposed until the N toggle reverts to normal after the transmission of the digit. In addition no instruction pulse will be transmitted over lead INS until the N toggle reverts to normal so that no shift is applied by V23 until the N toggle reverts to normal. Hence the next and subsequent digits if any will be regenerated in the manner previously described.

Finally at the end of the second line allocated to the sender, a group shift pulse is applied over lead GS and capacitor C10 to cause the toggle V20 to revert to normal and the control and discriminate circuit is ready for association with another sender. If the next time the sender S is associated with the circuit, the N toggle in the sender has still not reverted to normal, as may well be the case, no instruction pulse is received and no current flows over the discriminate lead. Regeneration then takes place. It is possible that the N toggle may revert while the sender is actually associated with the common equipment. In this case current will flow over the discriminate lead and the right-hand portion of V21 will be cut off. The left-hand portion, however, remains conducting since it is only possible to transmit an instruction pulse at the moment when the H toggle in the sender is tripped. The anode voltage of V21 does not therefore increase to a sufficient extent to cause current flow through the diode V22 and V23 is therefore not transposed.

Consideration will now be given to the circuit of the line test circuit LTC which is shown in Fig. 5. This circuit is composed of three similar switching units DVR, TRR and INSR which in operation resemble a relay with one make and one break contact. In each unit the valves V6, V9 and V12 are toggle circuits while valves V5 and V7 for DVR, V8 and V10 for TRR and V11 and V13 for INSR are gate valves consisting of pentodes all having a short suppressor grid base. When the right-hand portion of, for instance, V6 is conducting the gate valve V5 is open on its outer control grid and an input applied at LA to the inner control grid will pass to the output OA. A reset pulse on lead R will transpose the toggle, the gate valve V5 is closed and V7 is opened so that an input on IB passes to the output OB. Each unit can thus be regarded as shown in Fig. 7. A pulse on lead R causes the upper contact to open and the lower contact to close, this condition being maintained until a pulse on lead S is received which causes the relay to revert to the condition shown. The various interconnections between the inputs and outputs of the three relays shown in Fig. 5 and the various connections made to the S and R leads may be represented diagrammatically as shown in Fig. 8 and this drawing will be used to explain the operation of the circuit.

Referring now to Fig. 8, the 12th pulse from the pulse source transposes relay DVR so that contact A is opened and contact B closed. This is the condition when the beam arrives on the first dot area. The operation of the circuit depends on the condition of this dot area and whether writing, reading or regeneration is to be effected.

*1. No instruction pulse received and no digits stored*

As previously explained the beam will arrive at position 1 and as no digit is stored, a pulse will be received from the amplifier over lead AMP and will pass via B of DVR and A of INSR to the regenerate lead RG and thence to the control and discriminate circuit to cause the shift to be applied as previously explained. Relay DVR is restored on the next pulse from the pulse source over lead PS.

*2. Write instruction received*

The instruction pulse obtained on the tripping of the H toggle is transmitted to the circuit over lead INS and causes the INSR relay to open its A contacts and close its B contacts. The first pulse is thus prevented from passing to the regenerate lead RG so that no shift is applied but instead the first pulse operates the transfer relay TRR which opens contact A and closes contact B. Subsequent pulses thus pass over the transfer lead TR and the first of these pulses resets the instruction relay INSR to prevent the transfer of pulses on subsequent digits. Transfer relay TRR is restored on the 12th pulse. It will thus be seen that the first pulse is absorved by the line test circuit in this case.

*3. Read instruction received*

The read instruction comprises an instruction pulse and a current flow over the discriminate lead. The latter has no effect on the line test circuit but the instruction pulse causes the same operation as described in paragraph 2, the first pulse being absorbed while subsequent pulses are transmitted over the transfer lead TR.

Having described the various component circuits individually, a description will now be given of the manner in which the circuits operate together and for this purpose it will be assumed that the operator wishes to transmit the number 5432. It will be understood that the selection of four digits is purely arbitrary and any number up to a maximum of eight may be transmitted.

When the operator depresses the key K5 for the first digit, this digit will be injected into the electronic counter in the sender and the N toggle will be tripped by the operation of relay G. When the key K5 is released, relay G releases and removes the negative potential from the inner control grid of V15 which then takes up a potential substantially at earth. Nothing further happens until the H toggle is tripped when an instruction pulse will be transmitted over the lead INS to the control and discriminate circuit CD (Fig. 9) and to the line test circuit LTC (Fig. 8).

In the control and discriminate circuit the instruction pulse trips the toggle V20 but causes no further circuit operation. In the line test circuit, the instruction relay INSR is operated, thereby opening contacts A and closing contacts B. The relay DVR will also have been operated by the previous 12th pulse so that contacts A will be open and contacts B will be closed.

When the beam arrives at the first area in position 1, it will insert a dot and an impulse will be received from the amplifier. This pulse is fed over the lead AP to the line test circuit and will pass over contacts B of DVR and contacts B of INSR to operate the transfer relay TRR. Contacts A of TRR are opened while contacts B are closed. It will be noted that no pulse is fed over the regenerate lead RG to the control and discriminate circuit so that no shift is applied to the beam which therefore continues in position 1. The first pulse transmitted over the lead TR serves to restore the instruction relay INSR and this pulse together with subsequent pulses are passed through the valve V17 in the sender and thence over the lead CS to the counter. These pulses have no effect on the N toggle since this is already operated. Dots continue to be inserted in position 1 until the counter is counted out whereupon a pulse is transmitted from the last stage SS4 to restore the N toggle to normal. Current now flows through the valve V16 and in the control and discriminate circuit, the right-hand portion of V21 is cut off. The diode V22 now conducts causing the toggle V23 to trip whereupon current flows through V25, thereby cutting off the diode portion of V26 to cause the shift to be applied to the beam. The beam is thus moved to position 2 where it remains until the 12th pulse is transmitted from the X time base circuit. The 12th pulse restores the toggle V23 to normal and thus removes the shift so that the beam reverts to position 1 while in the line test circuit the transfer relay is restored and relay DVR is operated. As previously explained the digit stored is the complement of the required digit to the number 11.

Subsequent sections of the two lines allocated to the sender S will contain no digits and consequently the instruction relay INSR in the line test circuit is not operated. Thus when the beam arrives at the first area in the next section, a pulse will be received from the amplifier since the beam is in position where no dot has been inserted. This pulse will pass over contacts B of DVR, contacts A of INSR and thence over lead RG to the control and discriminate circuit CD where it trips the toggle V24. A shift is thus applied to the beam, the dot in position 2 is regenerated and that just formed in position 1 is erased. The toggle V24 is restored to normal by the next pulse from the pulse source over lead PS. This operation continues for the remainder of the second section and for all subsequent sections.

At the end of the scan over the last section, the group pulse from the Y timebase circuit is transmitted over lead GS to the control and discriminate circuit where it restores the toggle V20 to normal. This group pulse is also effective to restore the H toggle of the sender thus disconnecting the sender S from the common equipment.

It will be understood that the above operations take place extremely rapidly and will in all cases be ended before the operator depresses the next key. In fact it may happen that the beam arrives at the beginning of the first line allocated to the sender S before the operator has depressed the next key in which case no instruction pulse will be transmitted either to the control and discriminate circuit or to the line test circuit. The dot pattern on the two lines will thus be regenerated as described above.

When the operator depresses the next key, an instruction pulse will be transmitted to the control and discriminate circuit and to the line test circuit with the same results as described above. In this case however a digit is already stored in the first section of the first line and consequently when the beam arrives at the first area, a dot will have already been inserted so that no pulse is received from the amplifier and the toggle V24 remains normal. No shift is applied to the beam and the dot in position 1 is regenerated. This will continue as long as dots are found in position 1 and subsequently, the dots in position 2 are regenerated, the shift being applied for each dot. When the beam arrives at the second section, there will be no dot in position 1 so that the digit set up by the operation of the second key is inserted in the manner described for the first digit. The operation on subsequent digits is similar to the above and will not be described in detail.

When all the digits have been set up, the operator will depress the start-send key KSS and on the release of the key the potential at the inner control grid of V15 in the sender will be brought to earth potential since relay IP is released and relay IS maintained operated due to its slow release characteristics. When the sender S is next associated with the common equipment, an instruction pulse is transmitted to CD and LTC while current flows over the discriminate lead DISC extending to CD. The toggle V20 is tripped to cut-off the left-hand section of V21 while the right-hand section is cut off due to current flow over lead DISC. Current flows through the diode V22, toggle V23 is tripped and current flows through V25 whereupon the diode portion of V26 is cut off and the shift is applied to the beam. This shift is effective until toggle V23 is returned to normal. In LTC, relays INSR and DBR are operated. The beam as it scans the first section in position 2 will at first insert dots in the vacant areas and erase the dots in position 1. The insertion of the first dot will cause a pulse to be transmitted from the amplifier to LTC to cause the operation of transfer relay TRR, subsequent pulses passing over the transfer lead TR to V17 in the sender. The 12th pulse from the X time-base circuit restores V23 to normal to enable subsequent sections to be regenerated. The first pulse received in the sender trips the N toggle which reoperates relay IP to re-energize relay IS before the latter has had time to release. The pulses are also fed over lead CS to the counter and as the first digit was 5, the counter is advanced to give a count of 6. The operation of the N toggle also removes at N1 the lock on the multivibrator MV but as previously explained the transmission of a pulse by the multivibrator will not take place until the digit has been stored in the counter. When the multivibrator operates, pulses are transmitted over leads P1 and P2 and also over lead CS to the counter. During this operation the beam will scan the lines allocated to S a number of times but no instruction pulse will be transmitted to CD and LTC since relay IP is maintained operated over IS3 and N1. The existing dot pattern is thus regenerated.

When the 5 pulses have been transmitted by MV, a pulse is delivered from stage SS4 of the counter and applied to the N toggle which thereupon reverts to normal. Relay N is restoring, releases slow-to-release relay IP. Relay IP however, maintains the negative potential on the inner control grid for a period dependent upon its release characteristics to provide the inter-digital pause and on releasing opens the circuit of slow-to-release relay IS. The release period of IS is such that the sender S will be again connected to the common equipment before relay IS finally opens its contacts. An instruction pulse is then transmitted and current flows over lead DISC to CD. Pulses are transmitted to the sender over lead TR as previously described, the first pulse tripping the N toggle and operating relay IP which re-completes the circuit for IS before this has released. The remaining digits are transmitted in a similar manner and after the last digit has been transmitted, relay IP releases followed by relay IS and the sender is restored to normal.

It will be understood that the invention is not limited to the precise arrangement described above. For instance, while it is preferable to store the digits on the screen as the complement of the required digits to a predetermined number since by this means a single counting circuit may be used in the sender, it will be appreciated that the same digit may be stored and two counting circuits employed in the sender, one of which, for example, receives the digit from the keyset on writing or from the multivibrator on reading while the other receives the pulses from the amplifier, a signal being provided when both counters indicate the same digit. Further it is not necessary to employ a keyset of the type shown but any arrangement may be used which is capable of injecting digits into the electronic counter. Other modifications which will be apparent to those skilled in the art may also be made to the circuits.

I claim:

1. An arrangement for storing and retransmitting numerical information comprising a high-speed storage device, a plurality of controllers for supplying numerical information to said storage device and for receiving numerical information from said storage device, there being sufficient storage space on said storage device to provide a section individual to each of said controllers, continuously-operating allotting arrangements for successively associating said controllers with said storage device for supplying all the numerical information accommodated in any one individual section of said storage device, a transfer device for causing numerical information to be passed between said controllers and said storage device, means for producing progressive relative movement between successive elements of said storage device and said transfer device, and synchronising means for controlling the operation of said allotting arrangements so that a particular controller is associated with said storage device at the time said transfer device is co-operating with the section of storage space individual to such controller.

2. An arrangement for storing and retransmitting numerical information comprising a high-speed storage device, a plurality of controllers for supplying numerical information to said storage device and for receiving numerical information from said storage device, there being sufficient storage space on said storage device to provide a section individual to each of said controllers, continuously-operating allotting arrangements for successively associating said controllers with said storage device for supplying all the numerical information accommodated in any one individual section of said storage device, a first transfer device for causing numerical information to be transferred from any one of said controllers to said storage device while the controller concerned is associated therewith, a second transfer device for causing numerical information to be transferred from said storage device to any one of said controllers while it is associated with said storage device, means for producing progressive relative movement between successive elements of said storage device and said first and second transfer devices, and synchronising means for controlling the operation of said allotting arrangements so that a particular controller is associated with said storage device at the time said transfer devices are co-operating with the section of storage space individual to such controller.

3. An arrangement for storing and retransmitting numerical information comprising a cathode ray tube of the memory type including a screen, beam-forming means and deflecting means for said beam, a plurality of controllers for supplying numerical information for storage on said screen and for receiving numerical information stored on said screen, there being sufficient storage space on said screen to provide a section individual to each of said controllers, a switching device individual to each of said controllers for associating said controller with said cathode ray tube, first transfer means associated with said cathode ray tube for causing numerical information derived from any one controller to be stored on said screen while said controller is associated therewith by the operation of its individual switching device, second transfer means associated with said cathode ray tube for causing numerical information stored thereon to be passed to any one of said controllers while said controller is associated with said cathode ray tube by the operation of its individual switching device, means for generating deflecting waveforms, means for applying said waveforms to said deflecting means to cause said beam to traverse successively the individual storage sections on said screen, means for generating a control pulse each time said beam is brought into co-operation with a different section of storage space and means for effecting the operation of each one of said switching devices alone in turn in response to successive control pulse applied to all said switching devices.

4. An arrangement as claimed in claim 3 in which each switching device comprises a double triode toggle circuit having two stable positions and potentials derived from the anodes of the toggle circuit are applied to the controller for determining its association with the cathode ray tube.

5. An arrangement for storing and retransmitting numerical information comprising a cathode ray tube of the memory type including a screen, beam-forming means and deflecting means for said beam, a plurality of controllers for supplying numerical information for storage on said screen and for receiving numerical information stored on said screen, continuously-operating allotting arrangements for successively associating said controllers with said cathode ray tube, transfer means associated with said beam and said screen for causing numerical information to be passed between said controllers and said cathode ray tube, means for generating deflecting waveforms, means for applying said waveforms to said deflecting means to cause said beam to traverse said screen by step-by-step movement along a plurality of rows, and synchronising means for controlling the operation of said allotting arrangements whereby the beam is always caused to traverse the same respective rows on said screen while the tube is associated with the same controller.

6. An arrangement for storing and retransmitting numerical information, comprising a cathode ray tube of the memory type including a screen, beam-forming means and deflecting means for said beam, a plurality of controllers for supplying numerical information for storage on said screen and for receiving numerical information stored on said screen, continuously-operating allotting arrangements for successively associating said controllers with said cathode ray tube, first transfer means associated with said cathode ray tube for causing numerical information derived from any one controller to be stored on said screen while said controller is associated therewith, second transfer means associated with said cathode ray tube for causing numerical information stored thereon to be passed to any one of said controllers while said controller is associated with said cathode ray tube, means for generating deflecting wave-forms, means for applying said waveforms to said deflecting means to cause said beam to traverse said screen by step-by-step movement along a plurality of rows, and synchronising means for controlling the operation of said allotting arrangements whereby the beam is always caused to traverse the same respective rows on said screen while the tube is associated with the same controller.

7. An arrangement for storing numerical information comprising a cathode ray tube of the memory type including a screen, beam-forming means and first and second deflecting means for said beam, a controller for supplying numerical information for storage on said screen means for generating a first deflecting waveform, means for applying said waveform to said first deflecting means to cause the beam to traverse the screen by step-by-step movement along a first line, thereby imparting a characteristic charge distribution to the screen along said first line, means for generating a second deflecting waveform, and means controlled by said controller for applying said second deflecting waveform to said second deflecting means to cause the traverse of the beam to follow a second line displaced from said first line, the amount of displacement between said first and second lines being less than the distance at which the formation of a charge distribution at one spot by the beam will erase the charge distribution previously formed by the beam at an adjacent spot.

8. An arrangement for storing numerical information comprising a cathode ray tube of the memory type including a screen, beam-forming means and first and second deflecting means for said beam, a controller, a control circuit for said cathode ray tube, means in said controller for sending an instruction signal to said control circuit, means for generating a first deflecting waveform, means for applying said waveform to said first deflecting means to cause the beam to traverse the screen by step-by-step movement along a first line, thereby imparting a characteristic charge distribution to the screen along said first line, a signal plate adjacent said screen, means for sending a signal to said control circuit each time an increment of charge is imparted to said screen, means for generating a second deflecting waveform, means responsive to a signal from said signal plate for applying said second deflecting waveform to said second deflecting means to cause the traverse of the beam to follow a second line displaced from said first line, the amount of displacement produced by said second deflecting means between said first and second lines being less than the distance at which the formation of a charge distribution at one spot by the beam will erase the charge distribution previously formed by the beam at an adjacent spot, and means in said control circuit responsive to said instruction signal for preventing the application of said second deflecting waveform responsive to signals from said signal plate.

9. An arrangement for storing numerical information comprising a cathode ray tube of the memory type including a screen, beam-forming means and first and second deflecting means for said beam, a plurality of controllers for supplying numerical information for storage on said screen and for receiving numerical information stored on said screen, means for generating a first deflecting waveform, means for applying said waveform to said first deflecting means to cause the beam to traverse the screen by a step-by-step movement along a first line thereby imparting a characteristic charge distribution to the screen along said first line, means for generating a second deflecting waveform, means for applying said second deflecting waveform to said second deflecting means to cause the traverse of the beam to follow a second line displaced from said first line, the distance between said first and second lines being less than the distance at which the formation of a charge distribution at one spot by the beam will erase the charge distribution previously formed by the beam at an adjacent spot, continuously-operating allotting arrangements for successively associating said controllers with said cathode ray tube, means controlled from any one of said controllers for effecting the application of said second deflecting waveform to said second deflecting means, means for generating a third deflecting waveform, means for applying said third deflecting waveform to said second deflecting means to cause said beam to traverse said screen along a plurality of rows, said rows being spaced apart by a distance greater than that between said first and second lines, and sychronising means for controlling the operation of said allotting arrangements whereby the beam is always caused to traverse the same respective rows on said screen while the tube is associated with the same controller.

10. An arrangement for tranmitting digits in the form of trains of numerical impulses in response to the operation of a keyset, comprising a plurality of keysenders each including a keyset, a high-speed storage device including sufficient storage space to provide a section individual to each of said keysenders, continuously-operating allotting arrangements for successively associating said keysenders with said storage device for interval less than the time required for storing all the digits accommodated in any one individual section of said storage device, register means in each of said keysenders for registering digits in accordance with the operation of the associated keyset, a transfer device for causing digits to be transferred from said register means to said storage device, means for producing progressive relative motion between successive elements of said storage device and said transfer device, sending means in each keysender for transmitting trains of impulses over an external circuit, control means for causing the information registered on said storage device to control the operation of a keysender while it is associated with said storage device and synchronising means for controlling the operation of said allotting arrangements whereby the respective keysenders are always associated with the same section of storage space on said storage device.

11. An arrangement as claimed in claim 10 in which the digits are stored on the storage device in decimal notation and means are provided for marking the initial element of storage space corresponding to each digit together with means responsive to said marking to cause the transfer device to delay its operation until it encounters an unmarked initial element.

12. An arrangement for transmitting digits in the forms of trains of numerical impulses in response to the operation of a keyset, comprising a plurality of keysenders each including a keyset, a cathode ray tube of the memory type including a screen, beam-forming means and deflecting means for said beam, continuously-operating allotting arrangements for successively associating said keysenders, with said cathode ray tube for equal intervals of time regardless of the operation of said keysenders, register means in each of said keysenders for registering digits in accordance with the operation of the associated keyset, means for transferring the setting of any one of said register means to said cathode ray tube while the keysender concerned is associated therewith, sending means in each keysender for transmitting trains of impulses over an external circuit, control means for causing the information registered on said screen to control the operation of a keysender while it is associated with said cathode ray tube, means for producing deflecting waveforms, means for applying said waveforms to said deflecting means to cause said beam to traverse said screen by step-by-step movement along a plurality of rows, and synchronising means for controlling the operation of said allotting arrangements whereby the beam is always caused to traverse the same respective rows on said screen while the tube is associated with the same keysender.

13. An arrangement as claimed in claim 12 in which the digits are stored on the cathode ray tube in decimal notation in successive rows, a plurality of digits being registered in each row and a plurality of rows being assigned to each key sender.

14. An arrangement for transmitting digits in the form of trains of numerical impulses in response to the operation of a keyset, comprising a plurality of keysenders each including a keyset, a cathode ray tube of the memory type including a screen, beam-forming means and first and second deflecting means for said beam, continuously-operating allotting means for successively associating said keysenders with said cathode ray tube for equal intervals of time regardless of the operation of said keysenders, register means in each of said keysenders for registering digits in accordance with the operation of the associated keyset, means for generating a first deflecting waveform, means for applying said waveform to said first deflecting means to cause the beam to traverse the screen by step-by-step movement along a first line, thereby imparting a characteristic charge distribution to said screen along said first line, means for generating a second deflecting waveform, means controlled by the setting of any one of said register means for applying said second deflecting waveform to said second deflecting means while the keysender concerned is associated with said cathode ray tube to cause the traverse of the beam to follow a second line displaced from said first line for a distance dependent on the setting of said register means, the distance between said first and second lines being less than the distance at which the formation of a charge distribution at one spot by the beam will erase the charge distribution previously formed by the beam at an adjacent spot, sending means in each keysender for transmitting trains of impulses over an external circuit, control means for transferring to a keysender while said keysender is associated with said cathode ray tube the information registered on said screen in the form of displacement of charge distribution, means for generating a third deflecting waveform, means for applying said third deflecting waveform to said second deflecting means to cause said beam to traverse said screen along a plurality of rows, said rows being spaced apart by a distance greater than that between said first and second lines, and synchronising means for controlling the operation of said allotting arrangements whereby the beam is always caused to traverse the same respective rows on said screen while the tube is associated with the same keysender.

References Cited in the file of this patent

UNITED STATES PATENTS

| Number | Name | Date |
|---|---|---|
| 2,093,157 | Nakashima et al. | Sept. 14, 1937 |
| 2,454,652 | Iams et al. | Nov. 23, 1948 |
| 2,464,420 | Synder | Mar. 15, 1949 |
| 2,498,688 | Lesti | Feb. 28, 1950 |
| 2,501,637 | Synder et al. | Mar. 21, 1950 |
| 2,502,415 | Bray et al. | Apr. 4, 1950 |
| 2,523,365 | Gross | Sept. 26, 1950 |
| 2,527,652 | Pierce | Oct. 31, 1950 |
| 2,547,638 | Gardner | Apr. 3, 1951 |

OTHER REFERENCES

"A Storage System for Use with Binary-Digital Computing Machines," by F. C. Williams and T. Kilburn, Institution of E. E. Proceedings, part III, vol. 96, 1949, pp. 81–100.